Oct. 18, 1955     W. E. McAFEE     2,720,736
VALVE GRINDING MACHINE
Filed Sept. 1, 1953     2 Sheets-Sheet 1

INVENTOR.
WALTER E. McAFEE
BY
ATTORNEY

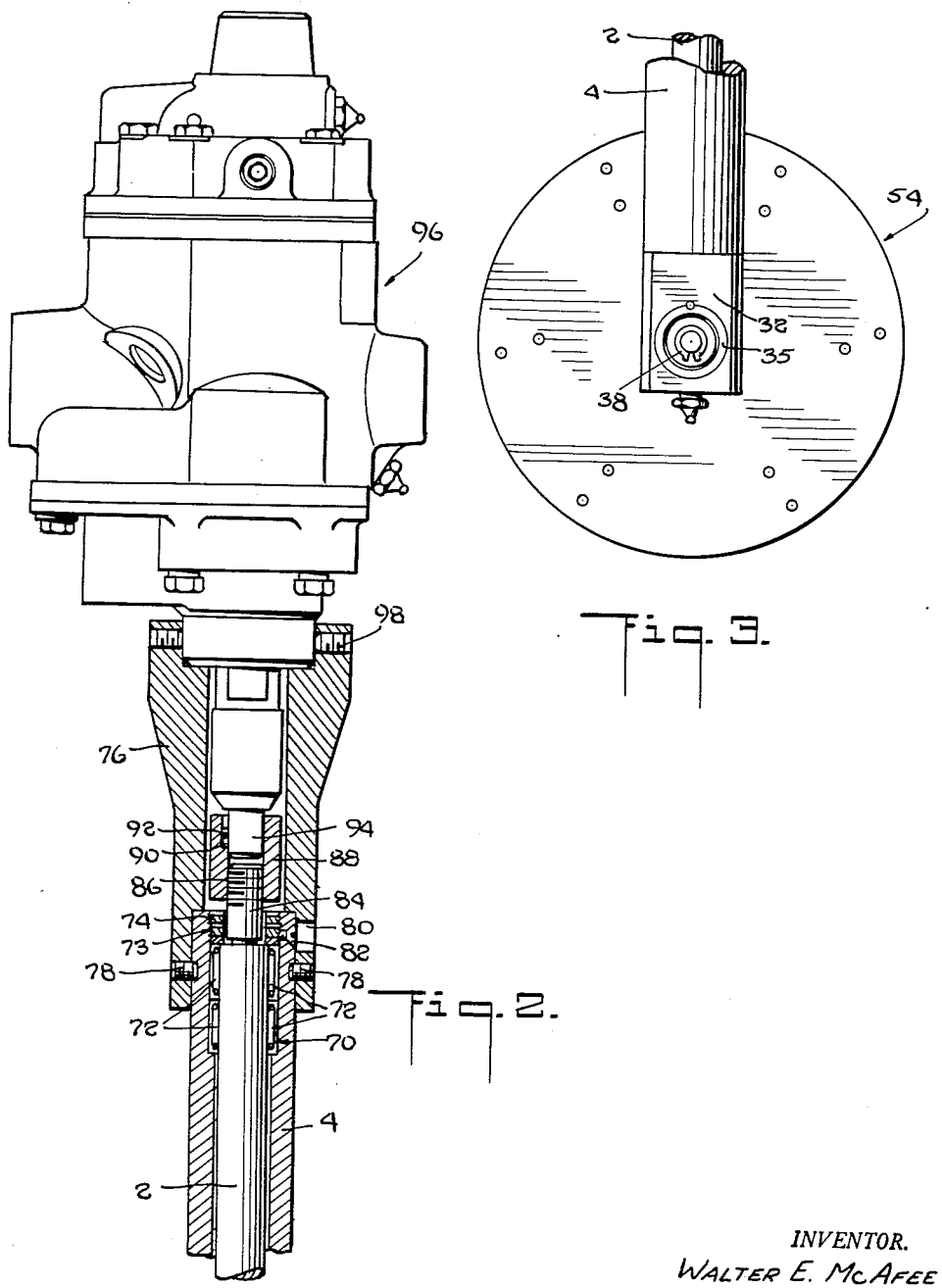

United States Patent Office 2,720,736
Patented Oct. 18, 1955

2,720,736

VALVE GRINDING MACHINE

Walter E. McAfee, Somerville, Mass., assignor to Leavitt Machine Company, Orange, Mass., a corporation of Massachusetts Application September 1, 1953, Serial No. 377,828

2 Claims. (Cl. 51—241)

This invention relates to valve grinding machines.

One object of the invention is a valve grinding machine adapted to grind valves in the line without requiring removal thereof.

A second object of the invention is a valve grinding machine adapted to grind a wide variety of valves.

A further object of the invention is a valve grinding machine which is portable and convenient to use.

A feature of the invention whereby some or all of the above objects may be attained is the provision of an adjustable shaft carried on the machine by a universal pivot and locking means to lock the shaft in a predetermined position. The grinding head of the machine may be carried on the shaft by a universal pivot.

Other features of the invention for the attainment of some or all of the objects is the provision of means on the machine to attach the machine in the valve to be ground.

The accompanying drawings illustrate the preferred embodiment of my invention and have been illustrated as particularly applied to a gate valve machine. In the drawings:

Fig. 2 is an elevation partly in section of the upper portion of the machine with the driving means attached thereto; and Fig. 3 is an elevation taken on line III—III of Fig. 1.

Figure 1:
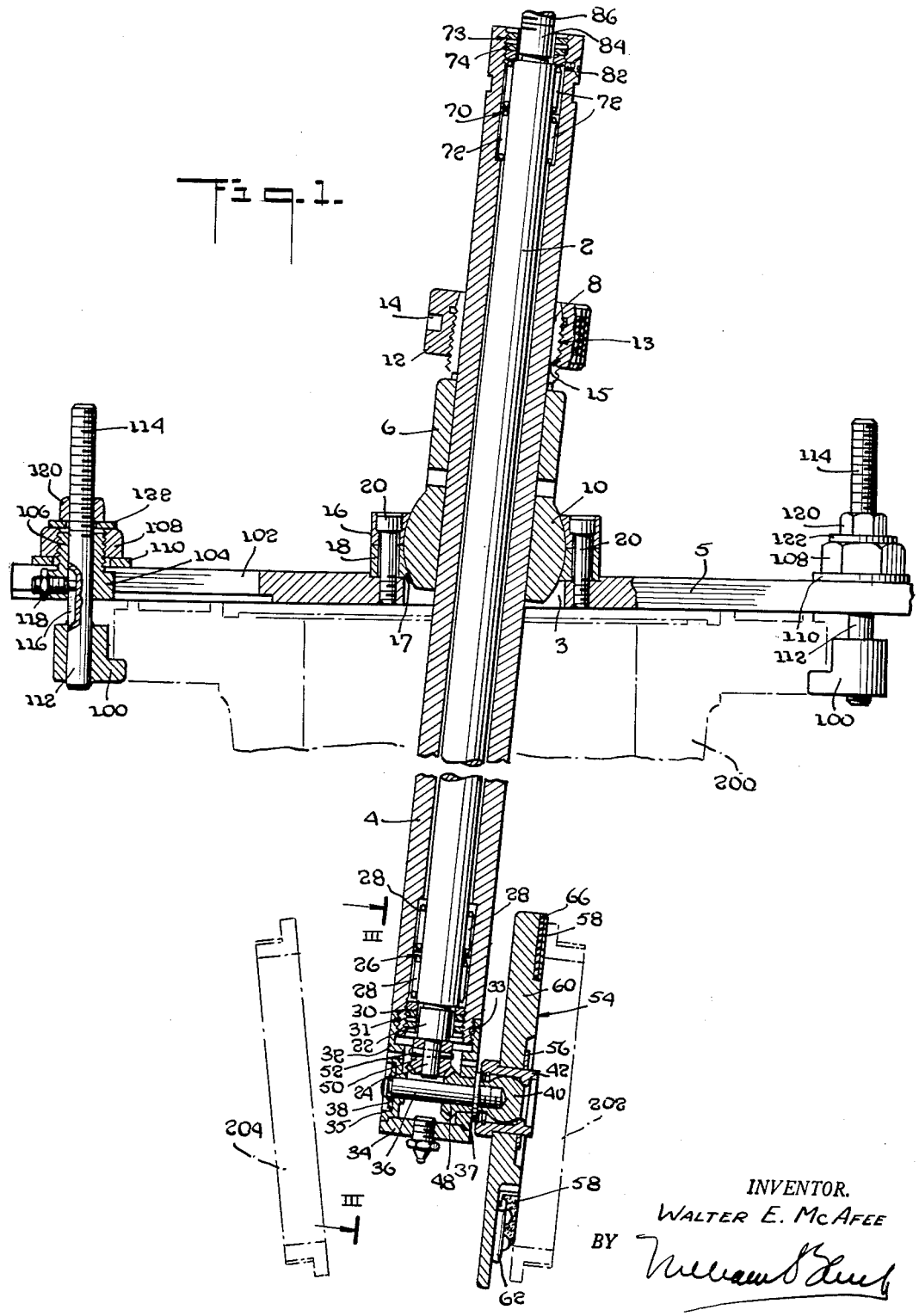
Fig. 1 is a sectional elevation of the grinding machine used with my invention.

Shaft 2 is rotatable within the adjustable sleeve 4. The sleeve 4 is adapted to slide in the opening 3 of the plate 5 and is loosely journalled in sleeve 6 which has the split head 8 at one end thereof and the universal ball 10 at the opposite end thereof. The lock nut 12 is threaded at 13 and is adapted to screw on the thread 15 of the split head 8 to tighten the split head 8 onto the sleeve 4 and thereby fasten the sleeve 4 to the sleeve 6. The hole 14 may be provided in the lock nut 12 for the insertion of a tool to turn the lock nut 12 if desired. The socket 17 for the ball 10 is illustrated as consisting of two rings 16 and 18 which are fastened to the plate 5 in any desired manner, as by screws 20.

At its lower end, the shaft 2 has the reduced portion 22 with the pinion 24 extending therefrom. Sleeve 4 has the enlarged bore 26 to accommodate the bearings 28 and is internally threaded at 27 to accommodate washers 30 which prevent the shaft 2 from sliding out of sleeve 4. The sleeve 4 is externally threaded at 31 at its lower end and secured thereto by thread 33 is the gear housing 32. The pinion 36 is journalled in the plugs 35 and 37 of the gear housing 32 and is retained therein by ring 38. Pinion 36 extends beyond the gear housing 32 and has attached thereto the ball 40 which has the socket 42 thereon. The axial line of the ball and socket pivot 40—42 is at a right angle to the shaft 2. Within the gear housing 32 the pinion 36 carries the toothed gear portion 48 which intermeshes with toothed gear portion 50 carried on pinion 24 of shaft 2 by pin 52.

Grinding disk 54 is mounted on the socket 42 and is retained there in any desired manner, as by ring 56. Grinding surfaces 58 are attachable onto the raised portions 60 of grinding disk 54 in any conventional manner, as by means of clamps 62. Resilient backing material 66 is interposed between the grinding surfaces 58 and the raised portion 60 of grinding disk 54.

At its upper end, sleeve 4 has the enlarged bore 70 to accommodate the bearings 72 and is threaded at 73 to accommodate the washers 74. The adapter 76 is attached to sleeve 4 in any manner, as by screws 78, and has the opening 80 to provide an access for adjustment of set screw 82. The shaft 2 has the reduced portion 84 which terminates in the threaded portion 86. The coupling member 88 is attached to the threaded portion 86 in any desired manner and has the slot 90 adapted to accommodate the pin 92 on the shaft 94 of the drive 96. The adapter 76 has the screws 98 to fixedly attach the drive 96 thereto.

The drive 96 may be of a conventional nature and need not be described herein.

The machine may be attached to the valve 200 (shown in dotted lines) in any conventional manner. In the drawings, plate 5 has the jaws 100 to mount the machine on the valve to be ground. Plate 5 has the slot 102 wherein the slider 104 is adapted to slide. The slider 104 has a threaded neck 106 upon which the washer 110 and the nut 108 is adapted to be secured. The washer 110 and the nut 108 are larger than the width of the slot 102 so that when the nut 108 is tightened, the washer 110 will bear against the plate 5 on each side of the slot 102 and fixedly lock jaws 100 in position. The slider 104 has a hole therethrough in which slides the shaft 112 which carries the jaws 100. Shaft 112 has the threaded portion 114 and the slot 116 wherein the lock screw 118 is accommodated to lock the shaft 112 in position. The nut 120 and washer 122 screw on the threaded portion 114 of the shaft 112 to raise or lower the shaft, as may be desired.

In operation, the machine is placed on the valve 200 (shown in dotted lines) with the plate 5 parallel to the flow of the current. The shafts 112 are raised or lowered by nuts 120 (as is required) until the jaws 100 reach a position where they will firmly grip the valve 200. The lock screws 118 are then tightened to maintain the jaws 100 in this position. The slider 104 is slid along the slot 102 until it tightly abuts the valve 200 and nuts 108 are tightened to maintain the jaws in this position.

The sleeve 4 is slid through the sleeve 6 until the grinding head 54 is in position to grind the valve seat 202 (shown in dotted line). The sleeve 4 is retained in this position by tightening the lock nut 12 around the split head 18 of the sleeve 6.

The adapter 76 is attached to the sleeve 4 through the set screws 78 and the coupling member 88 is screwed on threaded portion 86 of the shaft 2.

The drive 96 is mounted on adapter 76 through set screws 98 and the pin 92 on shaft 94 of drive 96 sets in slot 90 of coupling 88.

The sleeve 4 is easily maneuverable through universal ball and socket 10—17 and can reach the valve seat 202 regardless what its position is. The ball and socket arrangement 40—42 on the grinding head 54 allows the grinding head to grind valve seats 202 placed at any angle.

When the sleeve 4 and grinding head 54 have been adjusted, the drive 96 is made to operate and the shaft 2 will rotate through coupling 88 and which will rotate the pinion 36 and grinding head 54 through gears 50 and 48. The valve seat 202 will thus be ground.

After valve seat 202 has been ground, valve seat 204 may easily be ground by merely turning the ball 10 in socket 17 until the grinding head 54 is in position to grind valve 204. The ball and socket 40—42 will enable the grinding head 54 to shift to a different angle to grind valve seat 204.

After the two valve seats 202 and 204 have been ground and the drive 96 has been removed, the machine may be taken off the valve 200 by merely releasing jaws 100. If the machine is to grind valves of a different diameter, the grinding head 54 is removed and a different grinding head, having a diameter corresponding to the valve to be ground may be placed on the machine as pointed out above.

It will be observed that this arrangement provides a valve grinding machine which will grind valves without removing them from the line; which will grind a wide variety of valves; and which will be portable and convenient to use.

I claim:

1. A grinding machine to grind gate valve seats comprising a shaft mounted to swing on a universal pivot and being adjustable in a line parallel to its axis, a grinding head mounted on said machine on a universal pivot and having its axial line perpendicular to said shaft, and said shaft being provided with means to drive said grinding head.

2. A valve grinding machine as set forth in claim 1, wherein locking means are provided on said machine to lock said shaft in a predetermined position to prevent axial movement of said shaft, and wherein said locking means comprise a sleeve having a split head journaled on said shaft and a lock nut to tighten said split head onto said shaft.

References Cited in the file of this patent

UNITED STATES PATENTS

| | | |
|---|---|---|
| 513,392 | Hall | Jan. 23, 1894 |
| 685,697 | Smith | Oct. 29, 1901 |
| 789,469 | Williams | May 9, 1905 |
| 801,350 | Williams | Oct. 10, 1905 |
| 1,667,918 | Willis | May 1, 1928 |
| 1,761,326 | Campbell | June 3, 1930 |
| 1,787,871 | Moen | Jan. 6, 1931 |
| 2,408,280 | Wilcox | Sept. 24, 1946 |